United States Patent
Shin et al.

(10) Patent No.: US 10,602,342 B1
(45) Date of Patent: Mar. 24, 2020

(54) SIM OVER-THE-AIR UPDATE FOR NON-IP DEVICES

(71) Applicant: T-Mobile USA, Inc., Bellevue, WA (US)

(72) Inventors: Hogan Shin, Bellevue, WA (US); Kyeong Hun An, Sammamish, WA (US); Phani Ramisetty, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/233,025

(22) Filed: Dec. 26, 2018

(51) Int. Cl.
| | |
|---|---|
| *H04W 8/18* | (2009.01) |
| *H04L 12/26* | (2006.01) |
| *H04L 29/06* | (2006.01) |
| *H04B 1/3816* | (2015.01) |

(52) U.S. Cl.
CPC .......... *H04W 8/183* (2013.01); *H04B 1/3816* (2013.01); *H04L 43/10* (2013.01); *H04L 69/18* (2013.01)

(58) Field of Classification Search
CPC ...... H04W 8/183; H04B 1/3816; H04L 69/18; H04L 43/10
See application file for complete search history.

(56) References Cited

U.S. PATENT DOCUMENTS

| | | | | |
|---|---|---|---|---|
| 6,178,324 | B1* | 1/2001 | Choquet | H04M 1/72522 455/558 |
| 9,949,113 | B1* | 4/2018 | Vasudevan | H04W 8/24 |
| 2005/0193098 | A1* | 9/2005 | Khandpur | H04L 69/24 709/220 |
| 2015/0280765 | A1* | 10/2015 | Lowery | H04W 8/22 455/558 |
| 2016/0269923 | A1* | 9/2016 | Celik | H04W 24/10 |
| 2016/0373880 | A1* | 12/2016 | Khan | H04W 8/205 |
| 2019/0058711 | A1* | 2/2019 | Zhu | H04W 4/70 |
| 2019/0174341 | A1* | 6/2019 | Chincholi | H04B 17/336 |
| 2019/0223003 | A1* | 7/2019 | Balasubramanian | H04L 63/0853 |

* cited by examiner

Primary Examiner — Christopher M Brandt
(74) Attorney, Agent, or Firm — Lee & Hayes, P.C.

(57) ABSTRACT

The methods, systems, and computer readable media discussed herein are directed to updating data in a subscriber identity module (SIM) of a user equipment (UE), and more specifically, to enabling the UE, such as a narrow-band (NB) Internet of things (IoT) device, to update data and application(s) in the SIM without using short messaging system (SMS) messages. The UE, upon powering on, may execute an applet installed on the SIM card, and poll the MNO to determine whether data to be downloaded is available. Upon determining that the data to be downloaded is available, the UE may schedule downloading of the data, automatically download the data via an over-the-air (OTA) protocol according to the schedule, and update the SIM with the downloaded data.

12 Claims, 4 Drawing Sheets

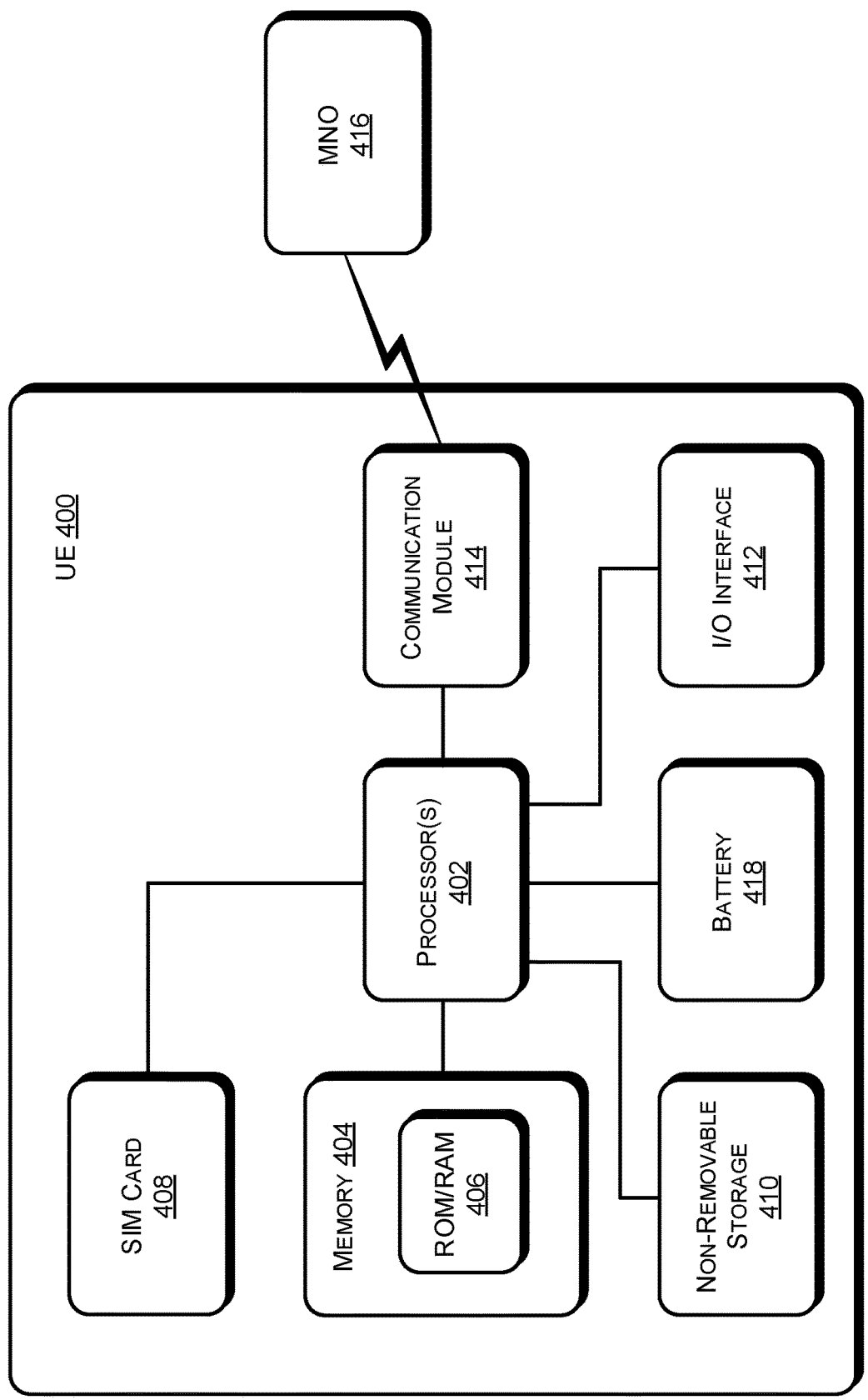

US 10,602,342 B1

SIM OVER-THE-AIR UPDATE FOR NON-IP DEVICES

BACKGROUND

Modern telecommunications systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. As increased capabilities of user equipment (UE) enable greater data consumption, placing increased demands on networks, new networks with higher capabilities have been developed. The 5G telecommunications technologies are the next generation mobile networks that are designed to combine both an evolution and revolution of the existing LTE/LTE-A mobile networks to provide a much higher connectivity, greater throughput, much lower latency, and ultra-high reliability to support new use cases and applications.

As more and more non-traditional communication devices, such as televisions, kitchen appliances, cars, watches, doors locks, sensors, and the like, which are often known as Internet of things (IoT) devices, become networked within these modern networks, maintaining communication with these IoT devices has become increasingly important. These IoT devices may be equipped with subscriber identity modules (SIMs) or SIM cards, which store various data and applications, such as international mobile subscriber identity (IMSI), network and/or carrier specific information such as preferred mobile network codes (MNCs), and the like. Mobile network operators (MNOs) of these IoT devices often require updating the data and applications in the SIM cards of the IoT devices, which are performed over-the-air (OTA). The MNO initiates the update process by sending a short messaging system (SMS) message to a target IoT device having an SMS communication interface, and upon receiving the SMS message, the target IoT device begins to download the data and update the SIM.

An IoT device, such as a narrow-band (NB) IoT device, may include a SIM card with data and applications but may not include an SMS communication interface. Therefore, once the SIM card is deployed, any parameters, including data and applications, of the SIM card of the NB IoT device cannot be updated via SMS messages.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example block diagram of a UE for updating data in a SIM card of the UE.

DETAILED DESCRIPTION

The methods, devices, and computer readable media discussed herein are directed to updating data in a subscriber identity module (SIM) of a user equipment (UE), and more specifically, to enabling the UE, such as a narrow-band (NB) Internet of things (IoT) device, to update data and application in the SIM without using short messaging system (SMS) messages.

In this disclosure, a SIM and a SIM card may be used interchangeably. A UE, such as an NB IoT device equipped with a SIM card, may require a SIM file download, for example, for data and application updates, according the business needs of the mobile network operator (MNO) of the UE and/or the requirements from partners of the MNO. However, because an NB IoT device may not have an SMS communication interface, any parameters, such as data and applications, of the SIM may not be updated via SMS messages once the SIM card is deployed.

To enable the UE to download the updates for the SIM card without SMS messages, the UE, upon powering on, may execute an applet installed on the SIM card, and poll the MNO to determine whether data to be downloaded is available. Upon determining that the data to be downloaded is available, the UE may schedule downloading of the data, automatically download the data via an over-the-air (OTA) protocol according to the schedule, and update the SIM with the downloaded data. Requirements of business partners and business needs may, therefore, be met by updating SIM cards even after deploying SIM cards without replacing the SIM cards. By utilizing a user datagram protocol (UDP), downloading the data for updating the SIM avoids requiring a new system, thereby avoiding added cost and complexity to the UE.

The UE may be an NB IoT device capable of operating in a guardband of a communication channel, which avoids congestion with main data traffic and increases spectral/bandwidth usage efficiency. The OTA update timing may also be flexibly scheduled to avoid transaction congestion between the UE and the MNO. Further, power consumption of the UE may be reduced, and battery life of the UE may be extended, by downloading data only at scheduled time slots instead of continuously being awake to receive the initial SMS message or repeatedly inquiring the MNO for availability of data to be downloaded.

The methods, devices, and computer readable media described herein may be implemented in a number of ways. Example implementations are provided below with reference to the following figures.

Figure 1:
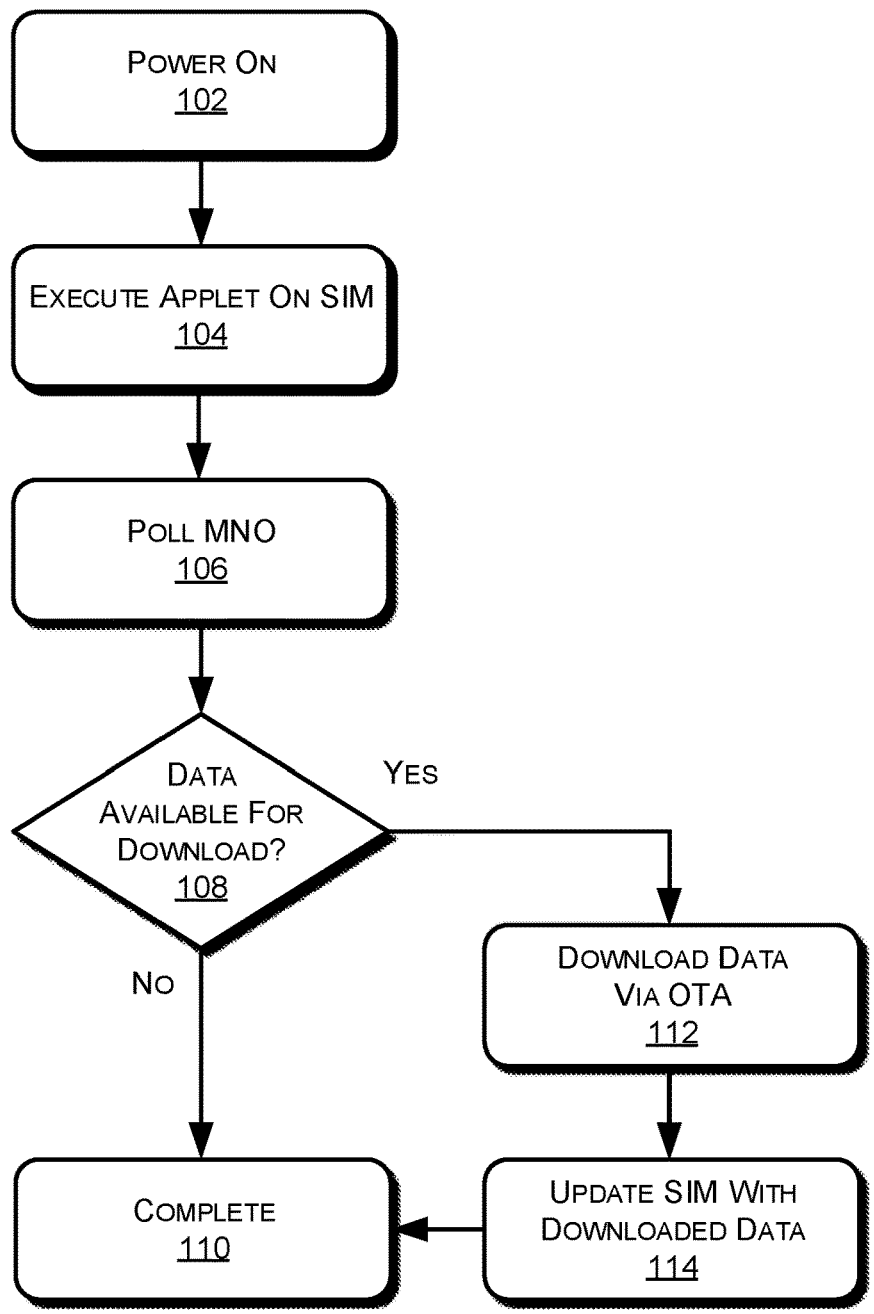
FIG. 1 illustrates an example process for updating data in a SIM card of a UE.

FIG. 1 illustrates an example process 100 for updating data in a SIM card of a UE.

The UE may be an NB IoT device capable of operating in a guardband of a communication channel.

At block 102, the UE may be powered on, and may execute an applet installed on the SIM card at block 104. The UE may execute the applet using a terminal profile command upon powering on the UE. The UE may then poll the MNO of the UE at block 106 to determine whether data may be available for download at block 108. Upon determining that there are no data to be downloaded at block 108, the process may be completed at block 110. Upon determining that there are data to be downloaded at block 108, the UE may, at block 112, automatically download the data via an OTA protocol, which may be a user datagram protocol (UDP). The UE may then update the SIM card with the downloaded data at block 114, and the process may be completed at block 110.

Figure 2:
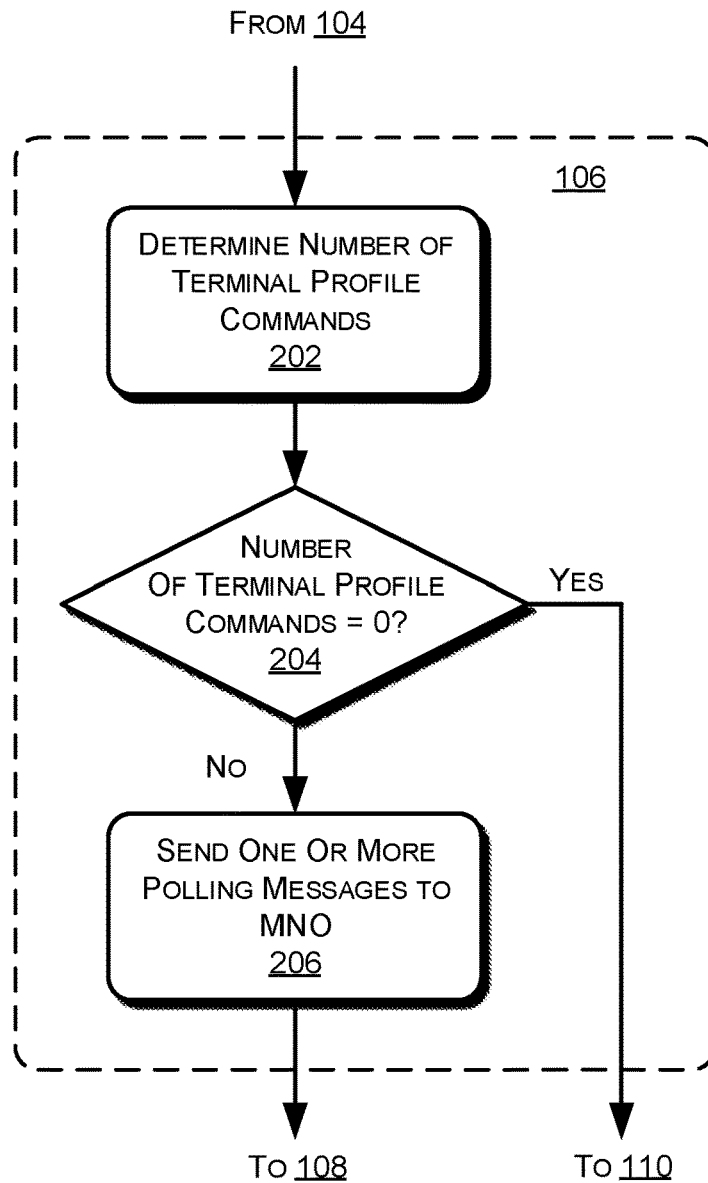
FIG. 2 illustrates an example detail of one of blocks of FIG. 1.

FIG. 2 illustrates an example detail of block 106 of FIG. 1.

The UE may poll the MNO at block 106 by sending one or more polling messages to the MNO based on a number of terminal profile commands where a terminal profile command is a command that the SIM receives from the UE whenever the UE is turned on. Frequency of polling messages may be adjusted based on the number of the terminal profile commands that the SIM receives from the UE. For example, if a count were set to five, after the SIM receives terminal profile command from the UE five times, the SIM would start initiating a polling mechanism. Thus, by using the count of terminal profile commands, the SIM may track how many times the UE wakes up from an idle/sleep mode at block 202. If the number of the terminal profile commands were determined to be zero at block 204, then the process may proceed to block 110 to be completed. Otherwise, that is the number of the terminal profile commands being one or more, such as the count being set to five, the UE may send one or more polling messages, corresponding to the number of the terminal profile commands, to the MNO at block 206.

Figure 3:
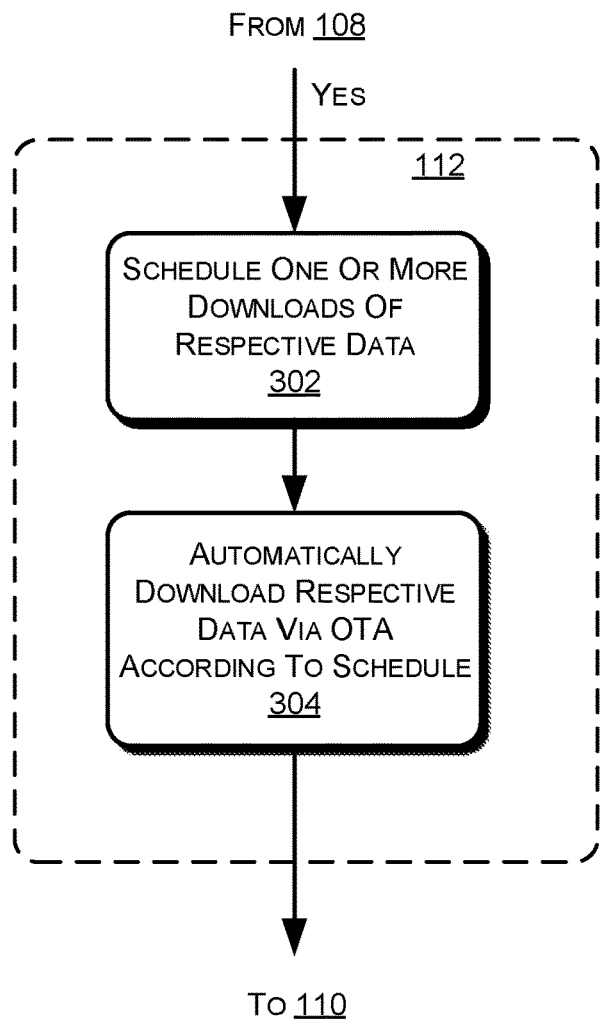
FIG. 3 illustrates an example detail of one of blocks of FIG. 1 for one or more terminal profile commands.

FIG. 3 illustrates an example detail of block 112 of FIG. 1 for one or more terminal profile commands.

Upon determining that data may be available for download at block 108, the UE may schedule one or more downloads of respective data at block 302 and may automatically download the respective data via the OTA protocol according to the respective download schedule at block 304.

FIG. 4 illustrates an example block diagram of a UE 400 for updating data in a SIM card of the UE 400.

The UE 400 may be an NB IoT device capable of operating in a guardband of a communication channel. The UE 400 may include one or more processors 402, memory 404 coupled to the one or more processors 402. In some embodiments, the one or more processors 402 may be a central processing unit (CPU), a graphics processing unit (GPU), or both CPU and GPU, or other processing unit or component known in the art. Memory 404 may include volatile memory (such as random-access memory (RAM)) and/or non-volatile memory (such as read-only memory (ROM), flash memory, etc.) 406. The UE 400 may include a SIM card 408 coupled to the one or more processors 402, and non-removable storage 410 including, but not limited to, flash memory, magnetic storage, optical storage, and/or tape storage that may provide non-volatile storage of computer-readable instructions, data structures, program modules, and other data for the UE 400.

The UE 400 may include an Input/Output (I/O) interface 412 coupled to the one or more processors 402 and may include a keyboard, mouse, touch pad, touch screen, microphone, and the like, configured to receive information from a user, and may also include a speaker, display which may be a touchscreen, and the like, configured to provide an output for the user. The UE 400 may include a communication module 414 coupled to the one or more processors 402 and configured to wirelessly communicate with a MNO 416. The UE 400 may also include a battery 418 configured to power all components of the UE 400.

Memory 404, a non-transitory computer storage medium, may store computer-readable instructions executable by the one or more processors 402, that when executed by the one or more processors 402, cause the one or more processors 402 to perform operations described above with referenced to FIGS. 1, 2, and 3. For example, when the UE 400 is powered on, the processors 402 may execute an applet installed on the SIM card 408. The processors 402 may execute the applet using a terminal profile command upon powering on, and may then poll the MNO 416 to determine whether data may be available for download. The processors 402 may poll the MNO 416 by transmitting a polling message to the MNO 416 using the communication module 414. Upon determining that there are no data to be downloaded, the processors 402 may terminate the process. Upon determining that there are data to be downloaded, the processors 402 may automatically download the data via an OTA protocol, which may be a UDP, update the SIM card 408 with the downloaded data, and then terminate the process.

The processor 402 may also poll the MNO 416 by sending one or more polling messages using the communication module 414 to the MNO 416 based on a number of terminal profile commands. Frequency of polling messages may be adjusted based on the number of the terminal profile commands. If the number of the terminal profile commands were determined to be zero, then the processors 402 may terminate the process. Otherwise, that is, the number of the terminal profile commands being one or more, the processors 402 may send one or more polling messages using the communication module 414 to the MNO 416.

Upon determining that data may be available for download, the processors 402 may schedule one or more downloads of respective data and may automatically download the respective data via the OTA protocol according to the respective download schedule.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Memory 404, discussed above with referenced to FIG. 4, is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RANI), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

The computer-executable instructions stored on one or more computer-readable storage media that, when executed by one or more processors, perform operations described above with reference to FIGS. 1, 2, and 3. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A method in a user equipment (UE) for updating data in a subscriber identity module (SIM) of the UE, the method comprising: executing an applet installed on the SIM; polling a mobile network operator (MNO) of the UE; determining whether data to be downloaded is available based on the polling; upon determining that the data to be downloaded is available, automatically downloading the data via an over-the-air (OTA) protocol; and updating the SIM with the downloaded data.

B. The method as paragraph A recites, wherein executing the applet installed on the SIM includes: executing the applet using a terminal profile command upon powering on the UE.

C. The method of as paragraph A recites, wherein upon determining that the data to be downloaded is available, automatically downloading the data via the OTA protocol includes: scheduling a download of the data; and automatically downloading the data via the OTA protocol according to the download schedule.

D. The method as paragraph A recites, wherein polling the MNO of the UE includes sending one or more polling messages to the MNO based on a number of terminal profile commands.

E. The method as paragraph D recites, wherein upon determining the data to be downloaded is available, automatically downloading the data via the OTA protocol includes: scheduling one or more downloads of respective data based on the number of terminal profile commands; and automatically downloading the respective data via the OTA protocol according to the respective download schedule.

F. The method as paragraph A recites, wherein the UE is a narrow band (NB) Internet of things (IoT) device capable of operating in a guardband.

G. The method as paragraph A recites, wherein the OTA protocol includes a user datagram protocol (UDP).

H. A user equipment (UE) configured to update data in a subscriber identity module (SIM) of the UE, the UE comprising: one or more processors; a communication module coupled to the one or more processors, the communication module configured to communicate with a mobile network operator (MNO) of the UE; the SIM, wherein the SIM is coupled to the one or more processors; and memory coupled to the one or more processors and the communication module, the memory storing computer-readable instructions executable by the one or more processors, that when executed by the one or more processors, cause the one or more processors to perform operations comprising: executing an applet installed on the SIM; causing the communication module to poll the MNO; determining whether data to be downloaded is available based on the poll; upon determining the data to be downloaded is available, automatically downloading the data via an over-the-air (OTA) protocol using the communication module; and updating the SIM with the downloaded data.

I. The UE as paragraph H recites, wherein executing the applet installed on the SIM includes: executing the applet using a terminal profile command upon powering on the UE.

J. The UE as paragraph H recites, wherein upon determining that the data to be downloaded is available, automatically downloading the data via the OTA protocol includes: scheduling a download of the data; and automatically downloading the data via the OTA protocol according to the download schedule.

K. The UE as paragraph H recites, wherein causing the communication module to poll the MNO of the UE includes sending one or more polling messages to the MNO using the communication module based on a number of terminal profile commands.

L. The UE as paragraph K recites, wherein upon determining the data to be downloaded is available, automatically downloading the data via the OTA protocol includes: scheduling one or more downloads of respective data based on the number of terminal profile commands; and automatically downloading the respective data via the OTA protocol according to the respective download schedule.

M. The UE as paragraph H recites, wherein the UE is a narrow band (NB) Internet of things (IoT) device capable of operating in a guardband.

N. The UE as paragraph H recites, wherein the OTA protocol includes a user datagram protocol (UDP).

O. A non-transitory computer storage medium configured to store computer-readable instructions by one or more processors, that when executed, cause the one or more processors to perform operations comprising: executing an applet installed on a subscriber identity module (SIM) of a user equipment (UE), the UE having the one or more processors; polling a mobile network operator (MNO) of the UE; determining whether data to be downloaded is available based on the polling; upon determining that the data to be downloaded is available, automatically downloading the data via an over-the-air (OTA) protocol; and updating the SIM with the downloaded data.

P. The non-transitory computer storage medium as paragraph O recites, wherein executing the applet installed on the SIM includes: executing the applet using a terminal profile command upon powering on the UE.

Q. The non-transitory computer storage medium as paragraph O recites, wherein upon determining that the data to be downloaded is available, automatically downloading the data via the OTA protocol includes: scheduling a download of the data; and automatically downloading the data via the OTA protocol according to the download schedule.

R. The non-transitory computer storage medium as paragraph O recites, wherein polling the MNO of the UE includes sending one or more polling messages to the MNO based on a number of terminal profile commands.

S. The non-transitory computer storage medium as paragraph R recites, wherein upon determining the data to be downloaded is available, automatically downloading the data via the OTA protocol includes: scheduling one or more downloads of respective data based on the number of terminal profile commands; and automatically downloading the respective data via the OTA protocol according to the respective download schedule.

T. The non-transitory computer storage medium as paragraph O recites, wherein the OTA protocol includes a user datagram protocol (UDP).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method in a user equipment (UE) for updating data in a subscriber identity module (SIM) of the UE, the method comprising:
   executing an applet installed on the SIM;
   polling a mobile network operator (MNO) of the UE, wherein polling the MNO of the UE includes sending one or more polling messages to the MNO based on a number of terminal profile commands;
   determining whether data to be downloaded is available based on the polling;
   upon determining that the data to be downloaded is available, automatically downloading the data via an over-the-air (OTA) protocol, wherein the automatically downloading includes:
      scheduling one or more downloads of respective data based on the number of terminal profile commands; and
      automatically downloading the respective data via the OTA protocol according to the respective download schedule; and
   updating the SIM with the downloaded data.

2. The method of claim 1, wherein executing the applet installed on the SIM includes:
   executing the applet using a terminal profile command upon powering on the UE.

3. The method of claim 1, wherein the UE is a narrow band (NB) Internet of things (IoT) device capable of operating in a guardband.

4. The method of claim 1, wherein the OTA protocol includes a user datagram protocol (UDP).

5. A user equipment (UE) configured to update data in a subscriber identity module (SIM) of the UE, the UE comprising:
   one or more processors;
   a communication module coupled to the one or more processors, the communication module configured to communicate with a mobile network operator (MNO) of the UE;
   the SIM, wherein the SIM is coupled to the one or more processors; and
   memory coupled to the one or more processors and the communication module, the memory storing computer-readable instructions executable by the one or more processors, that when executed by the one or more processors, cause the one or more processors to perform operations comprising:
      executing an applet installed on the SIM;
      causing the communication module to poll the MNO, including sending one or more polling messages to the MNO using the communication module based on a number of terminal profile commands;
      determining whether data to be downloaded is available based on the poll;
      upon determining the data to be downloaded is available, automatically downloading the data via an over-the-air (OTA) protocol using the communication module, including:
         scheduling one or more downloads of respective data based on the number of terminal profile commands; and
         automatically downloading the respective data via the OTA protocol according to the respective download schedule; and
      updating the SIM with the downloaded data.

6. The UE of claim 5, wherein executing the applet installed on the SIM includes:
   executing the applet using a terminal profile command upon powering on the UE.

7. The UE of claim 5, wherein the UE is a narrow band (NB) Internet of things (IoT) device capable of operating in a guardband.

8. The UE of claim 5, wherein the OTA protocol includes a user datagram protocol (UDP).

9. A non-transitory computer storage medium configured to store computer-readable instructions by one or more processors, that when executed, cause the one or more processors to perform operations comprising:
   executing an applet installed on a subscriber identity module (SIM) of a user equipment (UE), the UE having the one or more processors;
   polling a mobile network operator (MNO) of the UE, wherein the polling includes sending one or more polling messages to the MNO based on a number of terminal profile commands;
   determining whether data to be downloaded is available based on the polling;
   upon determining that the data to be downloaded is available, automatically downloading the data via an over-the-air (OTA) protocol, including:
      scheduling one or more downloads of respective data based on the number of terminal profile commands; and
      automatically downloading the respective data via the OTA protocol according to the respective download schedule; and
   updating the SIM with the downloaded data.

10. The non-transitory computer storage medium of claim 9, wherein executing the applet installed on the SIM includes:
    executing the applet using a terminal profile command upon powering on the UE.

11. The non-transitory computer storage medium of claim 9, wherein the OTA protocol includes a user datagram protocol (UDP).

12. The non-transitory computer storage medium of claim 9, wherein the UE is a narrow band (NB) Internet of things (IoT) device capable of operating in a guardband.

* * * * *